United States Patent [19]

Gleim

[11] Patent Number: 5,408,143
[45] Date of Patent: Apr. 18, 1995

[54] CIRCUIT FOR PROCESSING SENSOR SIGNALS

[75] Inventor: Günter Gleim, Villingen-Schwenningen, Germany

[73] Assignee: Deutsche Thomson-Brandt GmbH, Villengen-Schwenningen, Germany

[21] Appl. No.: 58,740

[22] Filed: May 10, 1993

[30] Foreign Application Priority Data

May 11, 1992 [DE] Germany .................. 42 14 920.7

[51] Int. Cl.⁶ .......................................... H03K 5/24
[52] U.S. Cl. .................................... 327/82; 327/63; 327/65; 327/77; 327/514
[58] Field of Search ............... 307/311, 362, 364, 549, 307/551, 561, 259, 355, 494, 540

[56] References Cited

U.S. PATENT DOCUMENTS

| | | | |
|---|---|---|---|
| 3,843,907 | 10/1974 | Genuit et al. | 307/364 |
| 4,220,857 | 9/1980 | Bright | 250/339 |
| 4,315,211 | 2/1982 | Walsh | 324/123 R |
| 4,321,487 | 3/1982 | Huykman | 307/311 |
| 4,388,528 | 6/1983 | Walter | 250/221 |
| 4,555,791 | 11/1985 | Gabillet | 307/364 |
| 4,718,025 | 1/1988 | Minor et al. | 364/550 |
| 4,835,422 | 5/1989 | Dike et al. | 307/362 |
| 4,862,385 | 8/1989 | Fujita | 364/518 |
| 5,001,364 | 3/1991 | Petrie et al. | 307/362 |
| 5,047,667 | 9/1991 | Howie | 307/355 |
| 5,061,859 | 10/1991 | Lovelace et al. | 307/311 |
| 5,073,717 | 12/1991 | Sturzebecher et al. | 307/311 |
| 5,138,177 | 8/1992 | Morgan et al. | 307/311 |

FOREIGN PATENT DOCUMENTS

| | | | |
|---|---|---|---|
| 0157997 | 10/1985 | European Pat. Off. | G01D 18/00 |
| 2059924 | 6/1972 | Germany | G01R 19/10 |
| 2919307 | 5/1978 | Germany | G01R 33/02 |
| 3811946 | 10/1989 | Germany | G01F 1/60 |
| 4000461 | 7/1990 | Germany | G01R 19/04 |
| 3914216 | 10/1990 | Germany | G01F 1/88 |
| 624482 | 1/1978 | Liechtenstein | G01D 3/04 |
| 1375556 | 11/1974 | United Kingdom . | |
| 2020829 | 11/1979 | United Kingdom . | |

WO89/00767 1/1989 WIPO .................. H01J 40/14

OTHER PUBLICATIONS

Derwent World Patent Index Record for DE 38 11 946, including English language abstract and descriptive title.
Derwent World Patent Index Record for DE 39 14 216, including English language abstract and descriptive title.

*Primary Examiner*—Timothy P. Callahan
*Assistant Examiner*—My-Trang Nu Ton
*Attorney, Agent, or Firm*—Joseph S. Tripoli; Lester L. Hallacher; Harvey D. Fried

[57] ABSTRACT

A circuit for unambiguously indicating the presence and comparative values of output signals from a plurality of sensors includes first and second comparators respectively providing first and second comparison signals having high or low logic levels. A source of reference voltages provides individual reference voltages to one input terminal of each of the comparators. A first sensor is arranged between a source of operating potential and a second input terminal of the first comparator. The first sensor switches the operating potential on and off of the second input terminal in accordance with the reception of energy by the first sensor to vary the output terminal of the first comparator between high and low logic levels when the reference potential exceeds the operating potential. A second sensor arranged is between the source of operating potential and the second input terminal of the second comparator. The second sensor switches the operating potential on and off of the second input terminal in accordance with the reception of energy by the second sensor to switch the output terminal of the second comparator between high and low logic levels when the operating potential exceeds the reference potential. The operating potential is blocked from at least one of the comparators when both of the sensors receive the same energy.

17 Claims, 5 Drawing Sheets

Prior Art

CIRCUIT FOR PROCESSING SENSOR SIGNALS

This invention is directed to method and device for processing sensor signals in a multi-sensor sensing device.

Processing stages are already known which process signals from sensors in a comparative manner and feed them to downstream evaluation stages which perform an analog or digital evaluation.

Thus, for example, a facility for the automatic adjustment of a deflection screen on a picture area is presented in the prior application DE-P 41 36 121.0 in which four sensors are arranged in such a way that signal from always two sensors form a measure for the deflector unit of a television device.

However, with the known processing stages for these sensor signals, there exists an undefined status of the output signals in the cases in which no light or the same amount of light is incident on the two sensors in question.

It is the object of the present invention to supply unambiguous output signals for the cases named.

Unambiguous output signals can be generated by a circuit for processing output signals from at least two sensors for measured variables, comprising: respective means for generating bias signals for each of the at least two sensor output signals, each of the sensor output signals, when present, being combined with the respective bias signals to generate respective composite signals; diode means coupled to the respective bias signal generating means; the circuit having a first mode of operation in which respective detection of the measured variables depends upon respective threshold values of the composite signals, a second mode of operation when at least one of the measured variables is present and the composite signals are not substantially equal in value, during which the composite signals are combined by the diode means and a third mode of operation when both the measured variables are present and the respective composite signals are substantially equal in value; means for storing the composite signals; means for generating at least one reference level signal; means for comparing each of the stored composite signals with the at least one reference level signal and generating different comparator output signals, which may be bilevel signals, positively indicative of each of the modes of operation. Means responsive to at least one of the measured variables may generate a trigger signal for loading the storing means During the second mode of operation, one of the different output signals is indicative of a first one of the composite signals having a larger value than a second one of the composite signals and another of the different output signals is indicative of the second one of the composite signals having a larger value than the first one of the composite signals.

The comparing means can generate a plurality of unique output signals. A first unique output signal positively indicates when neither of the measured variables is present. A second unique output signal positively indicates when at least one of the measured variables is present and a first one of the composite signals has a larger value than a second one of the composite signals. A third unique output signal positively indicates when at least one of the measured variables is present and the second one of the composite signals has a larger value than the first one of the composite signals. A fourth unique output signal indicates when both of the at least two measured variables are present and the composite signals are substantially equal in value.

According to the invention, output signals from two sensors, which, for example, are constructed as light-sensitive diodes, are superimposed with signals in such a way that a value difference, for example, a voltage or current difference, is effected between the composite of superimposed signals. Instead of the sensor output signals, signals derived therefrom can also be used for this.

If a voltage superimposition is provided as superimposition, then this can be effected, for example, by means of a direct voltage source or a diode stage. In this context, diode stage is understood to be an element or componentry which permits a current conduction upon applying a direct voltage in one direction and prevents a current conduction upon applying a direct voltage in the opposite direction.

If a current superimposition is to be realized, then suitable current sources are to be provided.

The superimposed signals can be evaluated by means of a suitable evaluation stage (analyzer). This evaluation can be carried out by comparing the superimposed signals with reference voltages or reference currents respectively.

Although the invention is suitable for processing output signals from different types of sensors, its employment with sensors constructed as light-sensitive diodes is then particularly advantageous the adjustment of an indicator (display) unit is to be regulated responsive to the light signals. Such a display unit can be, for example, part of a television device, in particular a projection television device.

However, it is also possible to process signals from other types of sensors, such as magneto-resistive sensors, Hall elements, light, capacitance, heat, electrical sensors or the like.

An evaluation downstream of the processing the sensor signals must be made available for longer periods with some applications. It is advantageous to store the sensor output signals, signals derived therefrom, the superimposed signals and/or the processed signals.

In order to minimize the influence of disturbing variables, it is advantageous to store such signals depending on the nature of sensor signals.

The integration of the sensor signals or signals derived therefrom is especially advantageous in the cases in which the invention-type processing is to be used as a part of a regulation for a display device with a kinescope.

This is based on the finding that the phosphor compounds normally used in kinescopes exhibit differing delay times, until the full luminosity is realized, upon a brief fading-in of a red, a green, a blue spot of light. Furthermore, it has also been discovered that the temporal integral lies in the same order of magnitude regardless of which color is to be presented, and, therefore, can be processed by the same electrical circuit.

Further features, advantages and details of the invention will be explained in connection with the following embodiment examples.

Before describing the embodiment examples in more detail, it should be pointed out that the blocks illustrated individually in the figures merely serve for the better understanding of the invention. Normally, single blocks or several blocks together are combined into units. These can be realized in integrated or hybrid technology or as a program-controlled microcomputer or as a part of a program suitable for its control respectively.

However, the elements contained in the individual stages can also be arranged separately.

In the following, means and signal progressions with identical meanings in the figures are always provided with the same reference characters, and, once they have been described, further reference to them will only be made insofar as this is necessary for understanding the present invention.

Figure 1:
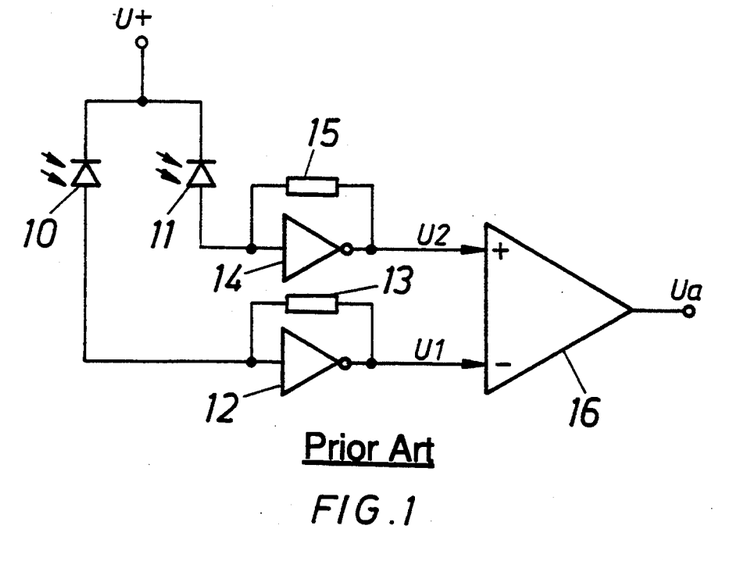
FIG. 1 is a signal processing circuit according to the art.

The signal processing device according to the state of the art shown in FIG. 1 comprises a first sensor 10 and a second sensor 11 which are presented as light-sensitive diodes here. The output signals of the first sensor 10 are sent to a first feedback amplifier 12 which has a first feedback resistor 13 in its feedback path (branch). The signal of the second sensor 11 is sent to the input of a second feedback amplifier 14 with a corresponding second feedback resistor 15. The output of the first amplifier 12 is connected to the negative input of a comparator 16 and the output of the second amplifier 14 is connected to the positive input of said comparator 16. The comparator 16 provides output signals depending on the radiation exposure of the sensors 10, 11 according to the following table:

TABLE 1

| I10 = I11 equal to 0 | I10 larger I11 | I10 smaller I11 | I10 = I11 not equal to 0 |
|---|---|---|---|
| Ua = ? | Ua = 0 | Ua = 1 | Ua = ? |

Here, I10 is the luminous intensity which is incident on sensor 10 and I11, that on sensor 11.

Although the sensors 10, 11 are presented here as photodiodes and the following description also assumes a signal processing corresponding to this, attention is drawn to the fact that the construction of the sensors 10, 11 merely depends on their conducting resistance, which alters corresponding to the presence of a variable to be measured.

Figure 2:
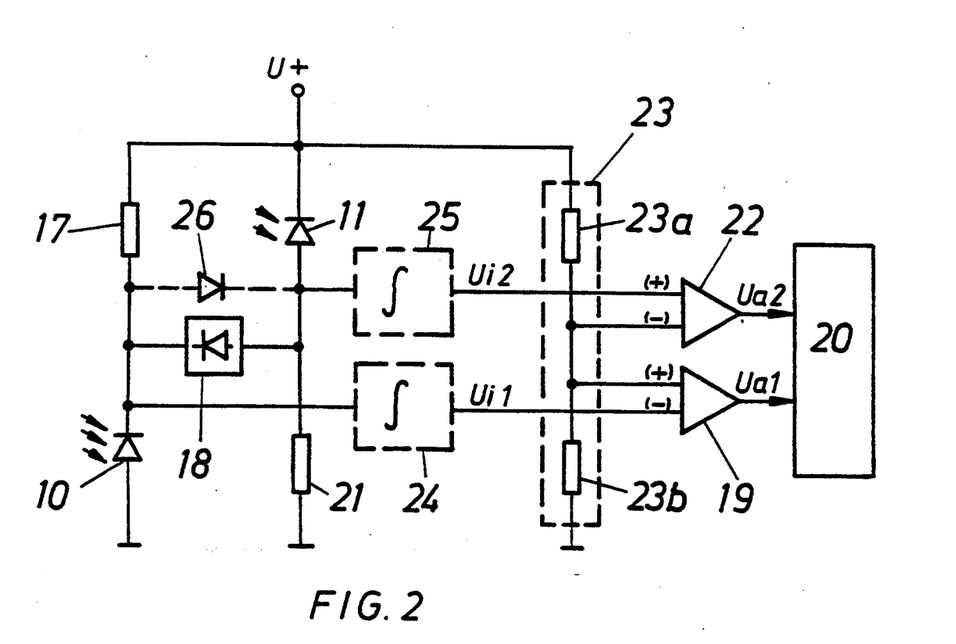
FIG. 2 is a signal processing circuit according to a first embodiment example of the invention.

FIG. 2 shows a first embodiment example of the invention. The first sensor 10 has its anode clamped to ground. Its cathode leads, on the one hand, via a first sensor resistance 17 to the positive voltage U+. The cathode of the sensor 10 is further coupled to a diode element 18 which can be designed as a simple semiconductor diode, as a network of components, which fulfill the function of a diode, or as another stage which exhibits a conducting function upon applying a direct voltage in a first direction, and a blocking function upon applying a direct voltage in the opposite direction. All of these alternatives, and others of similar function and consequence, are considered diode means.

In addition, the cathode of sensor 10 leads to the inverting (negative) input of a first comparator 19, at whose output the output signal Ua 1 is present which is fed to an evaluation stage 20. The second terminal of the diode element 18 is coupled with the anode of the second sensor 11 designed as a photodiode, the cathode of which leads to the positive voltage U+. The anode of this second sensor 11 is also connected via a second sensor resistance 21 to ground. In addition, the anode of sensor 11 is coupled with the noninverting (positive) input of a second comparator 22 whose output signal Ua 2 is fed to the evaluation stage 20. The inverting (negative) input of comparator 22 and the noninverting (positive) input of comparator 19 lead to the output of a reference voltage stage 23 where a reference voltage Ur is present.

In this embodiment example, the stage 23 is designed as a series connection consisting of a first reference resistor 23a and a second reference resistor 23b which are wired in series between the positive voltage U+ and ground. Instead of the one reference voltage Ur, several Ur1, Ur2 . . . can also be provided, the values of which are chosen in such a way that with given values for Ui1 and Ui2, the comparators 19, 22 provide unambiguous output signals Ua1, Ua2. This can achieved, for example, through the use of supplementary elements such as resistors, diodes or similar, not illustrated here, which are wired between the resistors 23a, 23b and from whose terminals the various reference voltages can be picked up.

Alternatively, a first integrator 24, wired between the cathode of the first sensor 10 and the negative input of the first comparator 19, and a second integrator 25, wired between the anode of the second sensor 11 and the positive input of the second comparator 22, are also provided in FIG. 2. Furthermore, a diode 26 is provided as an alternative, the anode of which leads to the first sensor resistance 17 and the cathode of which leads to the anode of the second sensor 11.

In the following, the operation of the embodiment example according to FIG. 2 will first be explained without the alternative component stages 24, 25, 26.

If there is incident light neither on the first sensor 10 nor on the second sensor 11, then both have high resistance and their resistance value is considerably greater than that of resistors 17, 21. Consequently, a series connection is formed from the first sensor resistance 17, the diode element 18 and the second sensor resistance 21, whereby said series connection is located between the positive voltage U+ (high) and ground (low). As the diode element 18 is arranged in the blocking direction, the signal Ui1 lies at potential U+ and the signal Ui2 at ground potential. These two voltage levels may be thought of as bias signals, setting thresholds which must be overcome in order to effect a reliable detection of the sensor output signals. Therefore, in terms of voltage, the negative input of comparator 19 lies above the positive input, which is at voltage Ur, and the output signal Ua1 is low.

The potential at the anode of sensor 11 is attracted to ground and, therefore, signal Ui2 as well. Hence, voltage at the positive input of comparator 22 is lower than that at the negative input. That leads to an output signal Ua 2 being low.

If light is now incident on just the first sensor 10, then its resistance is reduced to a value which, in comparison to that of the first sensor resistance 17, can be neglected. This leads to the signal Ui1 being attracted to ground potential and, hence, said signal lying below the voltage Ur. Consequently, the output signal of the first comparator 19 becomes "high".

Nothing changes with respect to the voltage Ui 2 and, thus, the output signal Ua2 if there continues to be no light incident on sensor 11.

If instead of the sensor 10, the second sensor 11 is exposed to light radiation, then its resistance is reduced to a value which, in comparison to that of the second sensor resistance 21, can be neglected. This leads to the signal Ui2 being attracted to positive potential and, hence, said signal lying above the voltage Ur. That leads to an output signal Ua2 being high.

The signal Ui1 is at high potential because the resistance of sensor 10 is high, and, consequently, the output signal Ua1 is low.

If light of differing intensities strikes both sensors 10, 11, then the effect known from series connections of current sources appears, i.e. that that sensor which provides the lower current has a high resistance, i.e. the sensor which receives less luminous intensity.

If light is incident on both sensors 10, 11 with equal intensity, then their resistances reduce in the same way to a value which lies below that of the corresponding sensor resistance 17 or 21 respectively. This leads to a quasi-series connection being formed from the second sensor 11, the diode element 18 and the first sensor 10. In this case, the diode element 18 lies in the conducting direction and a voltage value drops at this element corresponding to the normal conducting voltage. This means that a voltage difference amounting to the value of the conducting voltage is effected between the signals Ui1 and Ui2. Hence, the signal Ui1 lies below the reference voltage Ur by a value of half of this conducting voltage because this amounts to U+/2 in this embodiment example and, therefore, the output signal Ua 1 is high.

In contrast, the signal Ui2 lies above the reference voltage Ur by a value of half the conducting voltage of diode element 18 and, therefore, the output signal Ua 2 is also high. The states of the output voltages Ua1, Ua2 depending on the light signals received is summarized in Table 2. Here, I10 again stands for the luminous intensity incident on sensor 10 and I11 the luminous intensity incident on sensor 11.

TABLE 2

| I10 = I11 equal to 0 | I10 larger I11 | I10 smaller I11 | I10 = I11 not equal to 0 |
|---|---|---|---|
| Ua1 = low | Ua1 = high | Ua1 = low | Ua1 = high |
| Ua2 = low | Ua2 = low | Ua2 = high | Ua2 = high |

One can quite clearly see that the state in which light is incident on neither diode can be easily distinguished from the state in which an adequate quantity of light is incident on both diodes.

The evaluation stage 20 assesses the signals Ua1, Ua2 received. If the signal processing device according to the invention is employed as a part of a television device, then means can be contained in the evaluation stage 20 which correct the picture position of an image to be presented.

In particular, in the cases in which the position of a picture, which is only projected briefly, is to be corrected, frequent switching-over between the first state (no light incident on either diode) and the fourth state (equal quantities of light on both diodes) has to be reckoned with. This also means that the two signals Ui1 and Ui2 are constantly switched over between the value of the conducting voltage and ground or U+ respectively. As disturbing line and component capacitances are have to be taken into account, a brief fading-in of the light signal leads to incorrect measurements.

The diode 26 is incorporated in order to reduce the disturbing influences of said interference capacitances. It has the effect that the signals Ui1, Ui2 are merely switched between the forward (flow) voltage of diode 18 and the forward voltage of diode 26.

The use of a breakdown diode has proved especially advantageous for realizing the joint functions of diodes 18, 26.

The integrators 24, 25 were incorporated in applications involving a television device in order to compensate for the influences of the phosphor material used in the kinescope.

Figure 3:
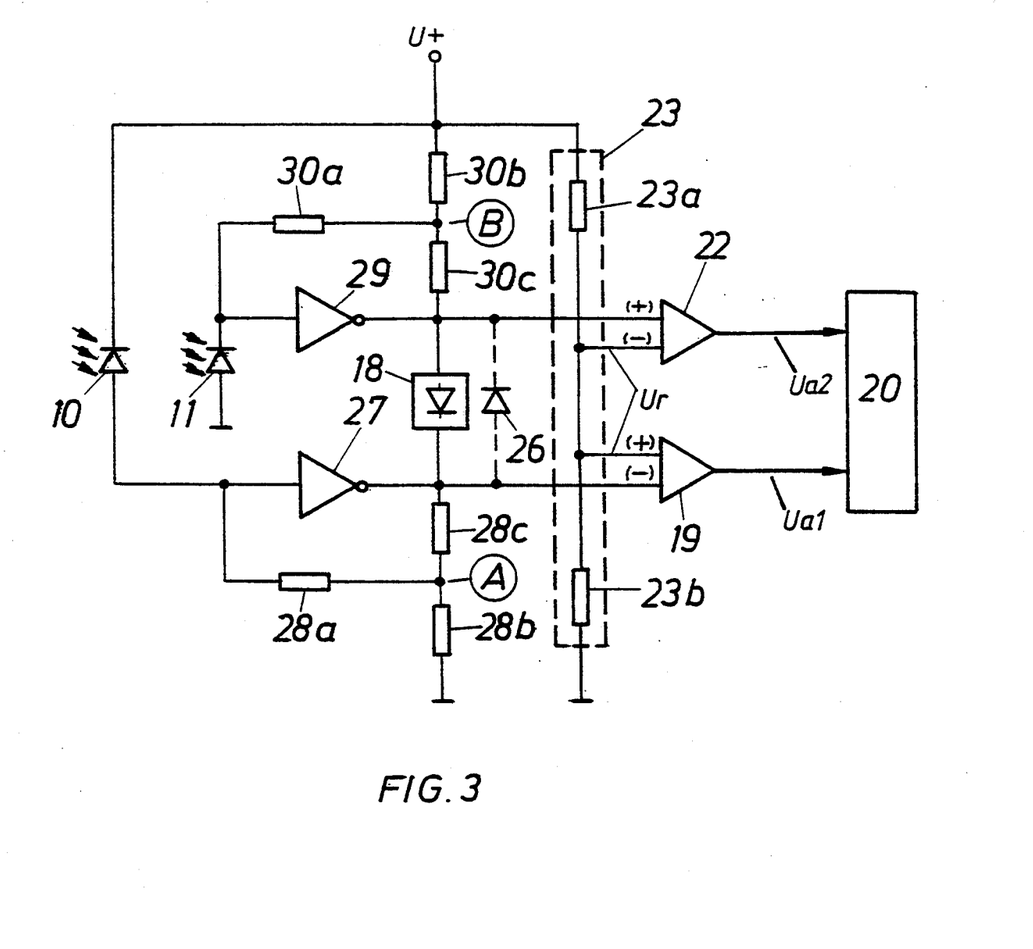
FIG. 3 is a signal processing circuit according to a second embodiment of the invention, which provides for amplification of the sensor output signals to enable rapid signal processing.

FIG. 3 shows a second embodiment example of the invention which provides for amplification of the sensor output signals and, hence, permits particularly quick signal processing. The anode of the first sensor 10 is connected to the input of a first inverting amplifier 27 and to a first resistance network 28, consisting of the resistors 28a, 28b, 28c. Here, one end of resistor 28b is connected to ground and from its other end (terminal A) resistor 28a leads to the input and resistor 28c to the output of the first inverting amplifier 27. The cathode of the first sensor 10 is connected to the positive voltage U+.

The anode of the second sensor 11 is clamped to ground and its cathode is connected to the input of a second inverting amplifier 29 which includes a second resistance network 30. This consists of a resistor 30a, the first terminal of which is connected to the input of amplifier 29 and from the second terminal (terminal B) of which a resistor 30b leads to the positive voltage U+, and a resistor 30c to the output of amplifier 29.

Firstly, diode element 18 is located between the outputs of amplifiers 27, 29, and the output of amplifier 27 leads to the negative input of the first comparator 19, and the output of the second amplifier 29 leads to the positive input of the second comparator 22. It should also be mentioned that the diode 26 may also be provided, as is indicated by the dotted lines in FIG. 3, and in addition the integrators 24, 25 which, for reasons of clarity, are not illustrated in FIG. 3.

It is preferable for the resistors 23a, 23b to have the same value so that the value of Ur essentially corresponds to one half of the value of U+.

It should also be mentioned that, as already described in the first embodiment example according to FIG. 2, two different reference voltages Ur1, Ur2 can be provided here too.

If no light is incident on either of the two sensors 10, 11, then both have high resistance. Assuming that the input current can be considered as being zero, this has the effect for the branch of the first sensor 10 that a voltage is applied not only at terminal A but also at the input of the first amplifier 27, whereby the value of said voltage corresponds to the operating point, i.e. half of U+ in this embodiment example.

As the input current of amplifier 27 lies very close to zero, owing to the voltage drop at resistor 28c, a voltage is present at its output which is greater than half the value of U+ and thus lies above the reference voltage Ur. Hence, the output signal Ua1 of comparator 19 becomes low.

The following is the outcome for the branch of the second sensor 11. At point B and at the input of the second amplifier 29 there is a voltage present, the value of which corresponds to the operating point, i.e. U+/2 in this embodiment example (input current=0). As the input current of amplifier 29 lies very close to zero, owing to the voltage drop at resistor 30c, a voltage is present at its output, the value of which is less than U+/2 and, hence, the output signal Ua2 of the second comparator 22 is low.

If more light is incident on the first sensor 10 than on the second sensor 11, then the resistance of the first sensor 10 drops and a current is impressed at the input of the first amplifier 27 by the voltage U+. Consequently, the output signal of the amplifier 27 is low, leading to a "high" output signal Ua1 of comparator 19. The output signal Ua2 hereby remains low due to the voltage drop at diode 18.

If more light is incident on the second sensor 11 than on the first sensor 10, then the output resistance of the second sensor 11 drops; this leads to the presence of an input signal at the input of the amplifier 29 which is low, thereby giving a high output signal. Hence, the output signal Ua2 of the second comparator 22 is high.

If equal quantities of light are incident on both sensors 10, 11, then the forward voltage of diode element 18 drops over this element leading to both Ua1 and Ua2 being high.

With the wiring of amplifiers 27, 29, the main aspect is that a voltage difference be effected between terminals A or B respectively and the respective amplifier outputs. This means that instead of resistors 38c or 30c respectively, other components such as diodes, direct voltage sources or the like can be provided.

Figure 4:
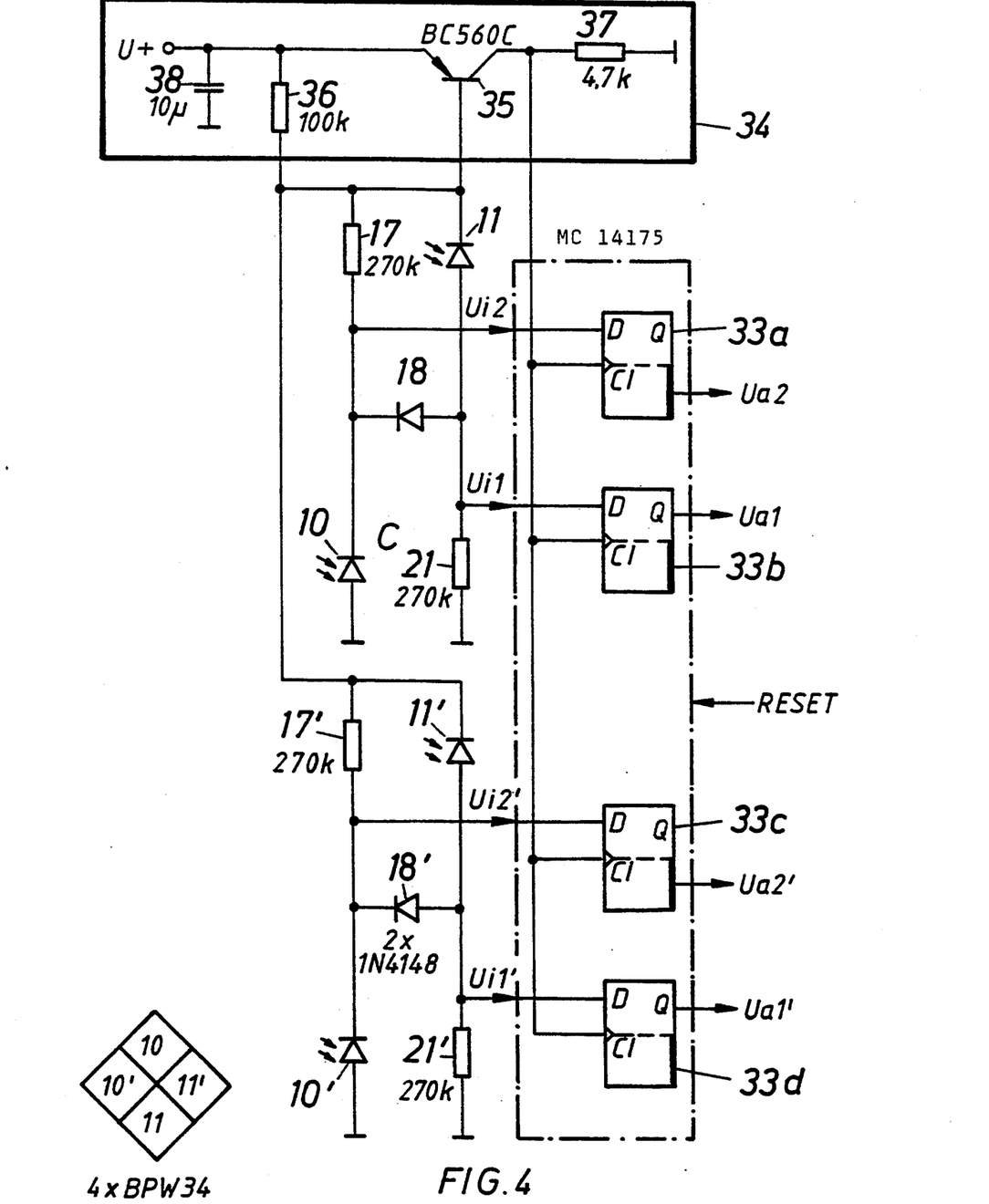
FIG. 4 is a signal processing circuit according to a third embodiment wherein flipflops are utilized instead of comparators.

A further embodiment example is illustrated in FIG. 4.

The major difference is that, firstly, four sensors 10, 11, 10', 11' are provided and, secondly, additional memory modules are present, here designed combined with means of comparison as D-type flipflops 33a, . . . , d, meaning that comparators 19, 22 can be omitted. Therefore, the input characteristic of flipflop 33a represents the means of comparison.

In order that the memories contained in the flipflops 33 only read in the superimposed sensor signals Ui1, Ui2, Ui1', Ui2' when the sensors 10, 11 or 10', 11' respectively are impressed with defined measured variables, such as the said spots of light of a television device, a trigger stage 34 is provided. This comprises, in this embodiment example, an NPN transistor with an emitter resistance 36, a collector resistance 37 and a capacitance 38.

The trigger stage 34 provided here switches the clock inputs of the flipflops 33 to high if the sensors 10, 11 effect a voltage between the base and the emitter of transistor 35 switching it to conducting. At this point in time, the flipflops 33 read in the superimposed signals Ui and make available the output voltages Ua at their outputs until new values are read in.

Figure 5:
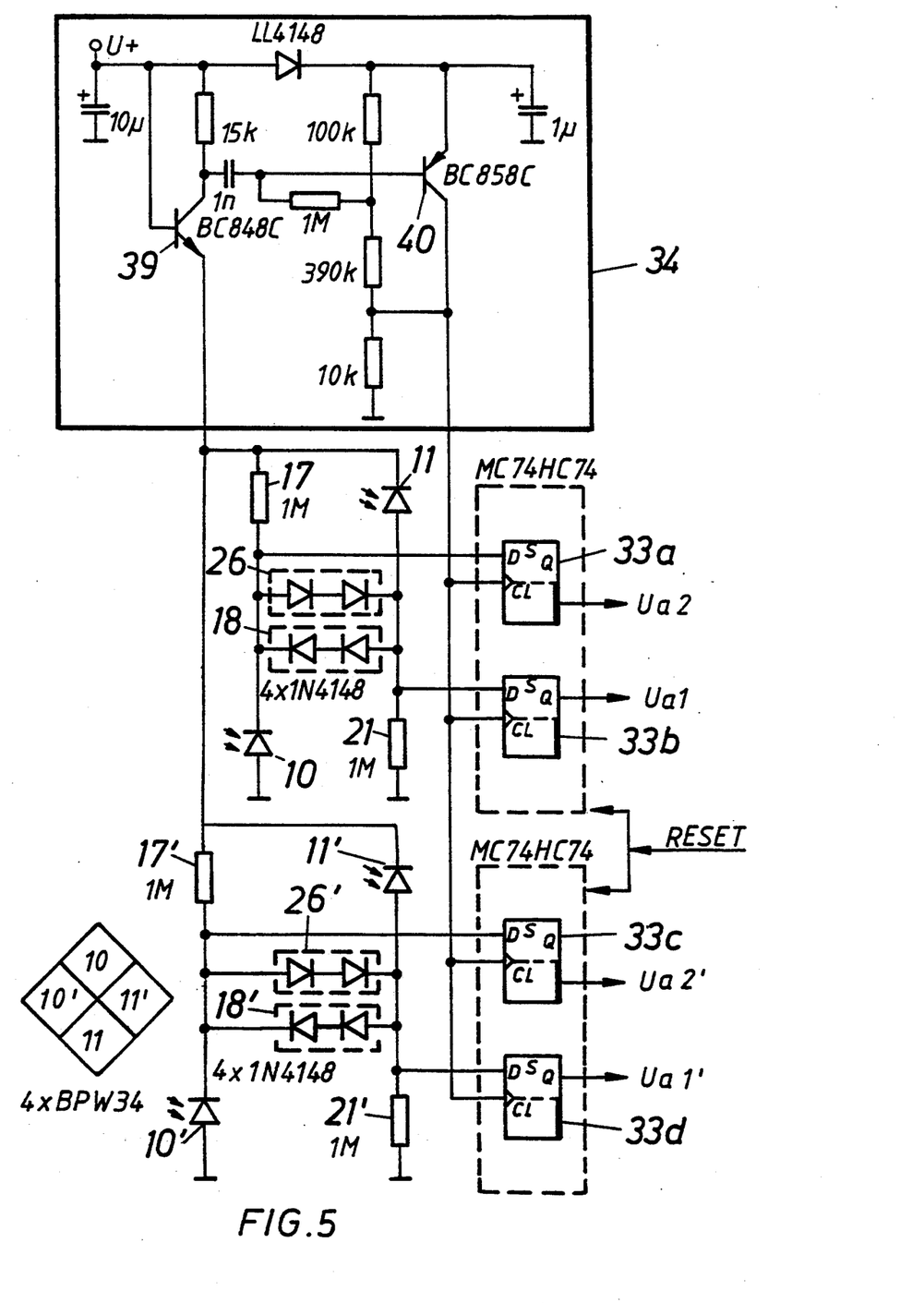
FIG. 5 is a signal processing circuit having a different trigger.

FIG. 5 shows a further embodiment example which is mainly distinguished from that of FIG. 4 in that the trigger stage 34 is realized differently.

The stage 34 illustrated here comprises an emitter follower and a switching transistor which, being constructed from the two transistors 39, 40 as well as further resistors and capacitors.

In order to avoid a voltage drop at the cathodes of sensors 11, 11' at the times when a light beam is incident on the sensors, diode 26 and, as a total of four sensor signals are to be evaluated, diode 26' are provided. A current flows through these permanently, causing a permanent voltage drop of $U_{BE}$ (approx. 0.7 Volt) at transistor 39. Thus, a voltage with the value $$U+ - U_{BE}$$

is permanently present at the cathodes of sensors 11, 11'.

As can also be seen from FIG. 5, both diode element 18 and diode 26 can each consist of several individual diodes. Realization within an integrated circuit permits one or more barrier (blocking) layer transistions between known doping stages to be utilized.

It should also be mentioned in conjunction with the embodiment examples of FIGS. 4 and 5 that the flipflops 33 can be reset at predetermined times by a downstream evaluation stage or by a stage collaborating with this. It is thereby guaranteed that the output signals Ua are not formed on the basis of previous measurements.

Figure 6:
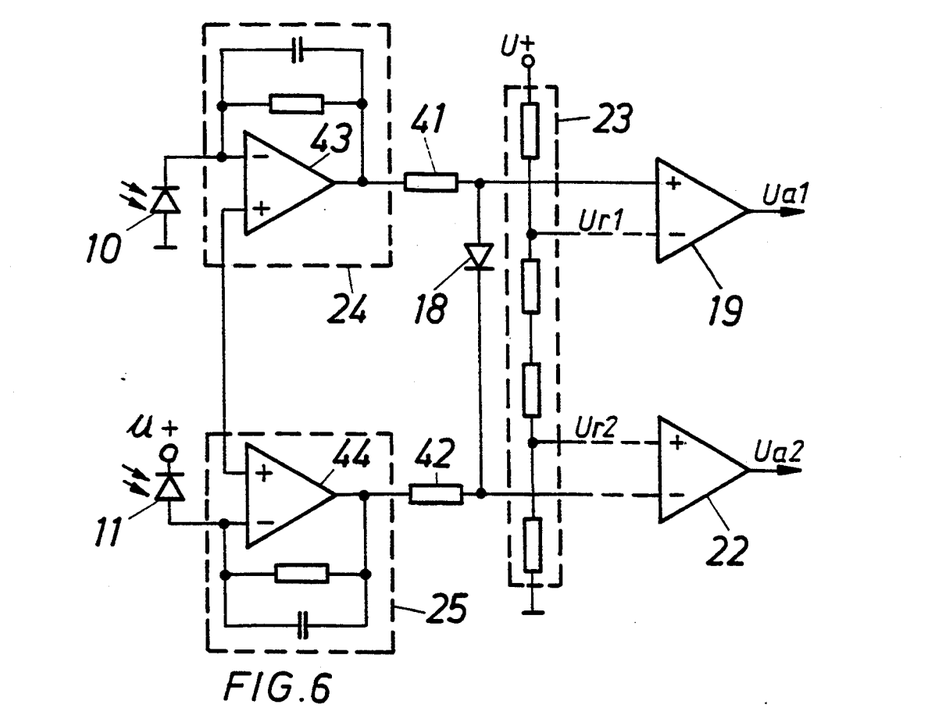
FIG. 6 is a signal processing circuit according to a fifth embodiment utilizing only operational amplifiers as active components.

In the embodiment example shown in FIG. 6, the output signals of sensors 10, 11 are first fed each to one of the integrators 24, 25 respectively which, in this embodiment example, contain operational amplifiers 43, 44.

The integrated signals are sent via resistors 41, 42 to the diode stage 18, which effects a voltage difference between them, and then fed to the comparators 19, 22.

In this example the reference voltage stage is arranged in such a way that various reference voltages are fed to the comparators.

The realization according to FIG. 6 has, in particular, the advantage that all active components are realized by operational amplifiers and that standard components which contain four operational amplifiers can be obtained at low cost. Consequently, the cost of components, especially customer-specific elements, can be reduced. Furthermore, there are fewer problems due to tolerances.

Figure 7:
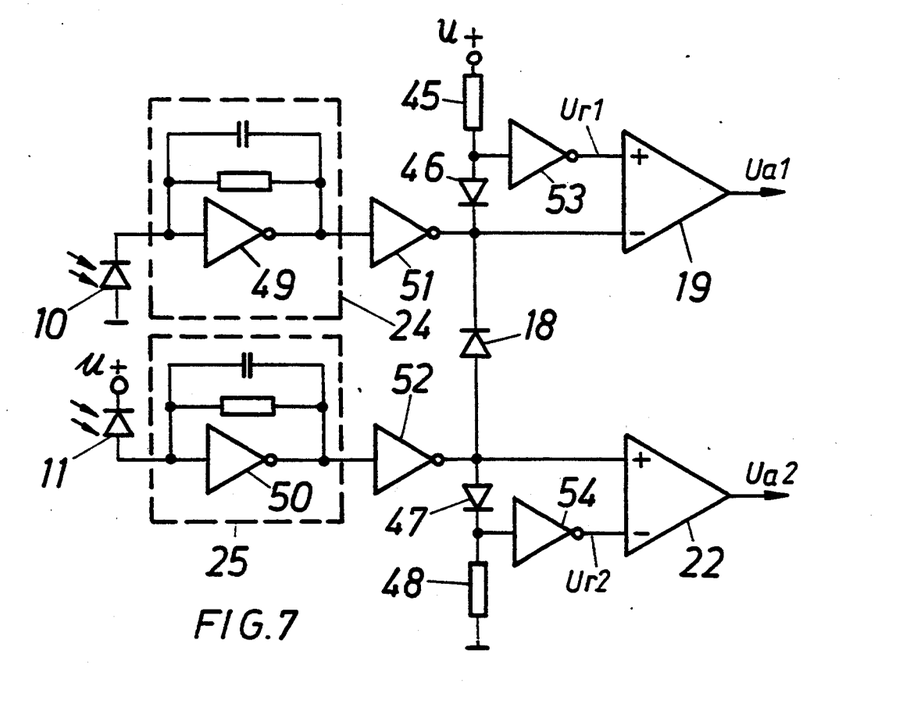
FIG. 7 is a signal processing circuit according to a seventh embodiment in which sensor signals are integrated and amplified.

The output signals from sensors 10, 11 are first integrated in the embodiment example of FIG. 7 also. The integrators 24, 25 in this embodiment example each contain an invertor 49 and 50 respectively as well as associated resistors and capacitors. The integrated signals are fed via further inverters 51, 52 to the diode stage 18 and the comparators 19, 22.

The reference voltages Ur1, Ur2 are formed by voltages which result from voltage drops at resistors 45, 48 and at diodes 46, 47 which are wired in series with diode stage 18. It should be mentioned at this point that the operational reliability of the embodiment example according to FIG. 7 can be increased if the diode stage 18 is matched (adjusted) to the other stages via several diode elements. Then the difference between the superimposed sensor signals and the reference voltages is increased.

However, operation with one diode element is then also guaranteed if the current passing through diodes 46, 47 is very small in comparison to that which flows through diode stage 18.

The embodiment example according to FIG. 7 has, in particular, the advantage that, firstly, amplification of the integrated sensor signals is provided and, secondly, a small number of standard components is required because integrated circuits with several inverters are available at low cost and tolerance problems are reduced.

Versions of the said embodiment examples can have at least one of the following variations:

Instead of the evaluation of sensor signal voltages, corresponding currents can also be processed and evaluated. This is possible, for example, in the embodiment example of FIG. 2 in that the resistors 17, 21 are replaced by suitable current sources.

The reference stage provided in the embodiment examples described can be omitted. The signals Ui1, Ui2 have unambiguous values depending on the measured variables which act on the sensors 10, 11. Therefore, the evaluation stage 20 can also evaluate the signals Ui.

What is claimed is:

1. A circuit for processing output signals from at least two sensors for measured variables, comprising:
   respective means for generating bias signals for each of said at least two sensor output signal, each of said sensor output signals, when present, being combined with said respective bias signals to generate respective composite signals;
   diode means coupled to said respective bias signal generating means;
   said circuit having a first mode of operation in which respective detection of said measured variables depends upon respective threshold values of said composite signals, a second mode of operation when at least one of said measured variables is present and said composite signals are not substantially equal in value, during which said composite signals are combined by said diode means and a third mode of operation when both said measured variables are present and said respective composite signals are substantially equal in value;
   means for generating at least one reference level signal;
   flip-flop memory means for storing said composite signals and also for comparing each of said stored composite signals with said at least one reference level signal and generating different comparator output signals positively indicative of each of said modes of operation.

2. The circuit of claim 1, wherein said comparing means generates: a first unique output signal when neither of said measured variables is present; a second unique output signal when at least one of said measured variables is present and a first one of said composite signals has a larger value than a second one of said composite signals; a third unique output signal when at least one of said measured variables is present and said second one of said composite signals has a larger value than said first one of said composite signals; and, a fourth unique output signal when both of said at least two measured variables are present and said composite signals are substantially equal in value.

3. The circuit of claim 2, wherein said unique output signals are bilevel signals.

4. The circuit of claim 1, wherein during said second mode of operation, one of said unique output signals is indicative of a first one of said composite signals having a larger value than a second one of said composite signals and another of said unique output signals is indicative of said second one of said composite signals having a larger value than said first one of said composite signals.

5. The circuit of claim 1, further comprising means responsive to at least one of said measured variables for generating a trigger signal for loading said flip flop memory storing means.

6. The circuit of claim 1, further comprising respective means for integrating said sensor output signals.

7. The circuit of claim 1, further comprising respective means for integrating said composite signals.

8. The circuit of claim 1, wherein said diode means clamps said composite signals to one another when at least one of said measured variables is present, whereby said composite signals track one another in value with a constant difference.

9. The circuit of claim 1, wherein said comparing means comprises respective comparators for comparing each said composite signal to said at least one reference level signal.

10. The circuit of claim 1, wherein said sensors are light emitting diodes.

11. The circuit of claim 1, wherein said sensors are Hall elements.

12. The circuit of claim 1, wherein said sensors are capacitive elements.

13. The circuit of claim 1, wherein said sensors are inductive elements.

14. The circuit of claim 1, wherein said sensors are electrical elements.

15. A circuit for processing output signals from at least two sensors for measured variables, comprising:
    respective means for generating bias signals for each of said at least two sensor output signals, each of said sensor output signals, when present, being combined with said respective bias signals to generate respective composite signals;
    diode means coupled to said respective bias signal generating means,
    means for generating at least one reference level signal; and,
    flip-flop memory means for storing said composite signals and also for comparing each of said stored composite signals with said at least one reference level signal and generating different comparator output signals positively indicative of: (1) neither of said measured variables being present; (2) one of said measured variables being larger in value than the other of said measured variables; and, (3) said measured variables being substantially equal in value.

16. The circuit of claim 15, wherein said different comparator output signals are further positively indicative of which one of said measured variables has a larger value.

17. The circuit of claim 16, further comprising means responsive to at least one of said measured variables for generating a trigger signal for loading said flip-flop memory storing means.

* * * * *